United States Patent
Hinduja et al.

[11] Patent Number: 5,424,017
[45] Date of Patent: Jun. 13, 1995

[54] METHOD FOR FORMING FIBER-REINFORCED ARTICLES

[76] Inventors: Murli L. Hinduja, 71 Adams Dr., Fremont, Ohio 43420; James P. Drysdale, 10335 Horseshoe Cir., Clarkston, Mich. 48348

[21] Appl. No.: 45,907

[22] Filed: Apr. 12, 1993

[51] Int. Cl.⁶ ............................................. B29C 45/14
[52] U.S. Cl. .................................. 264/163; 264/257; 264/328.7
[58] Field of Search ............ 264/163, 257, 258, 328.6, 264/328.7

[56] References Cited

U.S. PATENT DOCUMENTS

| | | | |
|---|---|---|---|
| 4,091,061 | 5/1978 | Turbier et al. | 264/257 |
| 4,330,494 | 5/1982 | Iwata et al. | 264/257 |
| 4,418,031 | 11/1983 | Doerer et al. | 264/257 |
| 4,444,832 | 4/1984 | Mazzola et al. | 264/328.6 |
| 4,692,291 | 9/1987 | Angell, Jr. | 264/259 |
| 4,950,532 | 8/1990 | Das et al. | 264/257 |
| 5,087,193 | 2/1992 | Herbert, Jr. | 264/257 |
| 5,196,152 | 3/1993 | Gamache et al. | 264/257 |
| 5,260,006 | 11/1993 | Scher et al. | 264/347 |
| 5,271,885 | 12/1993 | Denker et al. | 264/257 |

FOREIGN PATENT DOCUMENTS

| | | | |
|---|---|---|---|
| 59-194814 | 11/1984 | Japan | 264/257 |
| 4044834 | 2/1992 | Japan | 264/257 |

Primary Examiner—Allan R. Kuhns
Attorney, Agent, or Firm—Emch, Schaffer, Schaub & Porcello Co.

[57] ABSTRACT

A method and apparatus for molding fiberglass reinforced plastic articles using a new flowable liquid molding compound includes placing a mat of fiberglass reinforcing material in a mold half while the molds are open, rapidly closing the mold halves until they reach a distance of approximately 2" from a fully closed position, injecting the liquid molding compound which has been maintained at a temperature in the range of 75° to 77° F. into the space between the mold halves while the mold halves continue to close at a slower rate of speed, completing the closing of the mold halves after said injection step to compression mold the molding compound into conformity with the mold cavity while trimming excess glass reinforcing material and heating the shaped molding compound to a temperature causing it to set.

13 Claims, 5 Drawing Sheets

5,424,017

METHOD FOR FORMING FIBER-REINFORCED ARTICLES

BACKGROUND ART

The present invention relates to a liquid molding compound and a method and apparatus for rapidly producing articles, particularly glass fibers reinforced articles, therefrom. The molding of glass fibers reinforced resin articles has been long known in the art. Examples of various methods and apparatus for forming glass fibers reinforced plastic parts and formulations of materials for forming various types of parts may be found in the following U.S. Pat. Nos: 3,840,239; 3,957,943; 4,014,970; 4,204,822; 4,438,062; 4,404,261; 4,551,085 and 4,855,097.

DISCLOSURE OF INVENTION

The present invention relates to a new and improved thermoset liquid molding compound and to a method and apparatus for molding glass fibers reinforced resin articles using such compound. The present invention has many advantages over prior art molding in that the molding compound permits utilization of a low pressure, high speed, cycle with a low viscosity molding compound permitting its direct injection into the molds. This injection takes place just prior to the mold halves reaching their fully closed position at which they compression mold the compound to conform with the mold cavity. Under the present invention, good wetting of the glass fibers reinforcement is achieved with accurate parallelism and excellent dimensional stability of the finished part.

According to the present invention, liquid molding compound of the formulation disclosed herein is maintained at a temperature in the range of 75°-77° F. and has a viscosity sufficiently low, on the order of less than 10,000 cps. The low viscosity material can be readily pumped and injected into the space between the nearly closed mold halves. According to the process, the mold halves are moved toward one another at a relatively high rate of speed until reaching a predetermined distance from one another. Speed is then reduced significantly and, the flowable liquid molding compound is injected into the space prior to completion of closing of the mold halves preferably, through a single port using a pumping/metering system. At the closing of the mold halves, the plastic is conformed with the mold cavity using compression pressures. The mold halves are heated to a temperature in the range of 290° F. to 300° F. The liquid molding compound has a mold release agent which eliminates the necessity of using an external mold release.

BEST MODE OF CARRYING OUT INVENTION

Figure 1:
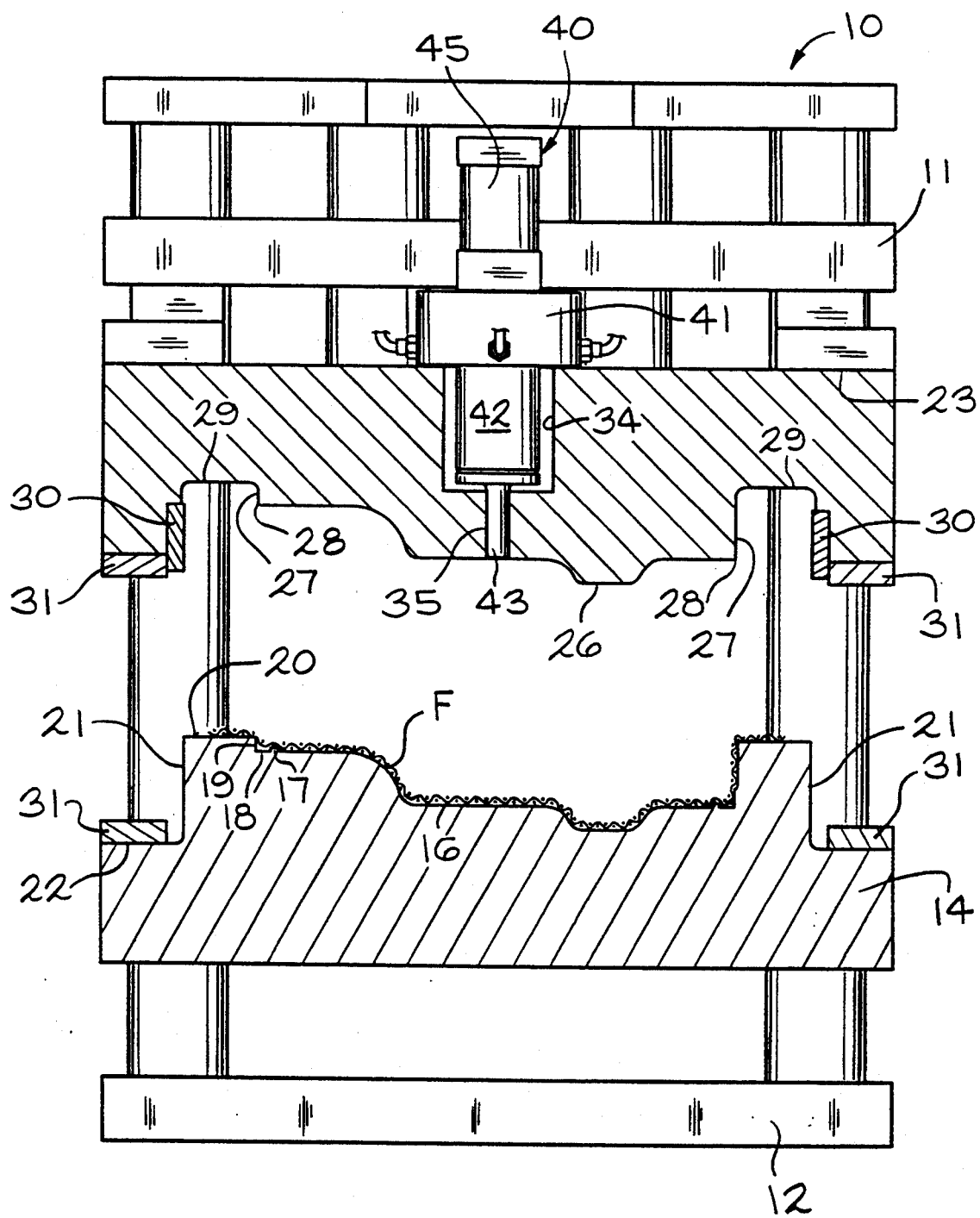
FIG. 1 is a schematic elevational view, partly in section showing a machine for molding a plastic part according to the present invention.
Figure 2:
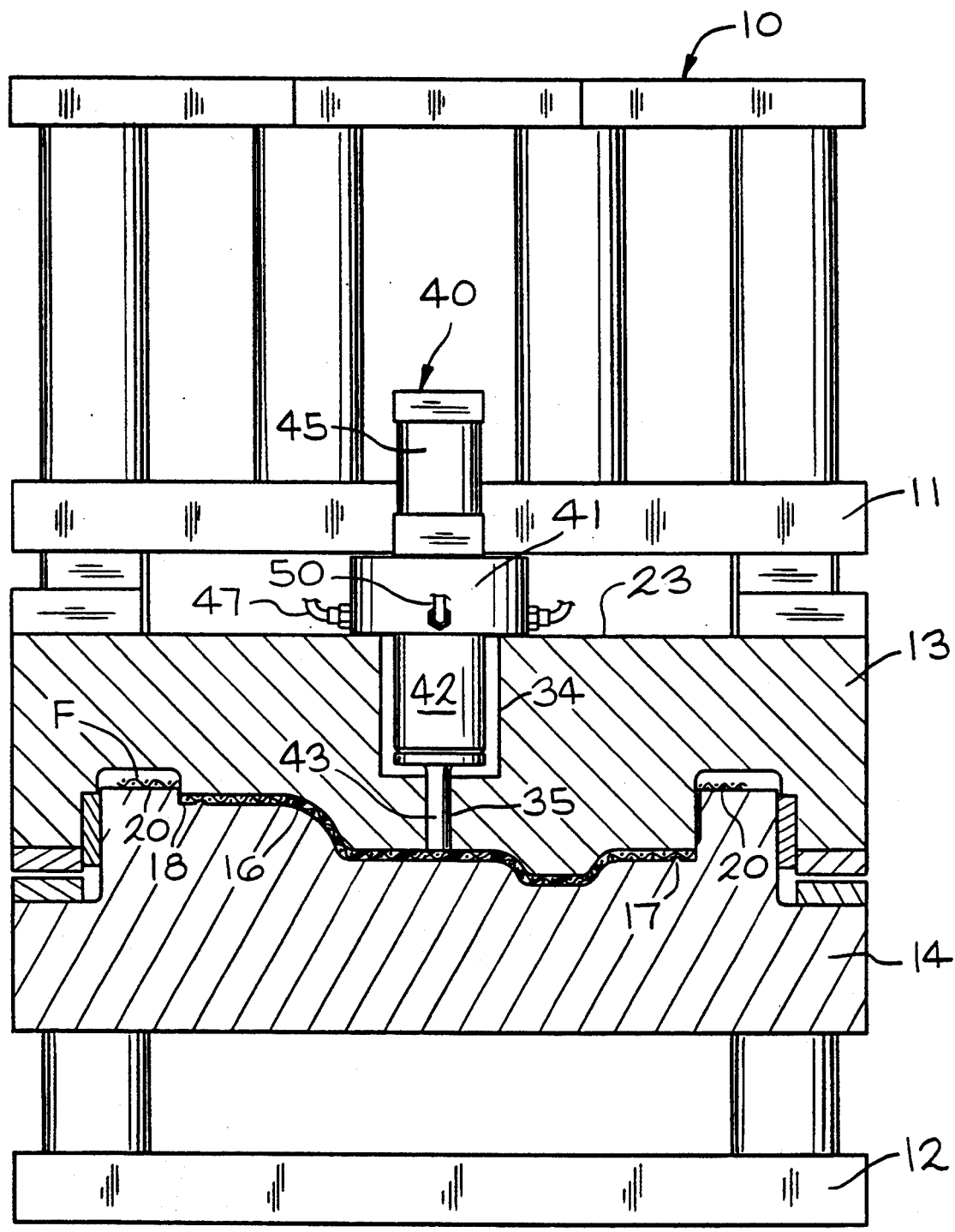
FIG. 2 is a view similar to FIG. 1 showing the mold halves in a nearly closed position and the liquid molding compound being injection molded therein.

Referring now to the drawings, there is provided a molding machine generally designated by the numeral 10 having an upper platen 11, a lower platen 12, an upper mold half 13 mounted for movement with the upper platen 11 and a lower mold half 14 fixedly mounted for support by the lower platen 12. Preferably, the mold halves are formed of steel and are provided with means for maintaining them at a temperature in the range of 290°-300° F. Means for maintaining molds within a predetermined range are well known in the art and are not shown in the drawings.

The basic molding machine 10 may be a conventional one such as one manufactured by Williams, White, and Company, Moline, Iowa, and sold by it as its Model C-3841B.

Figure 3:
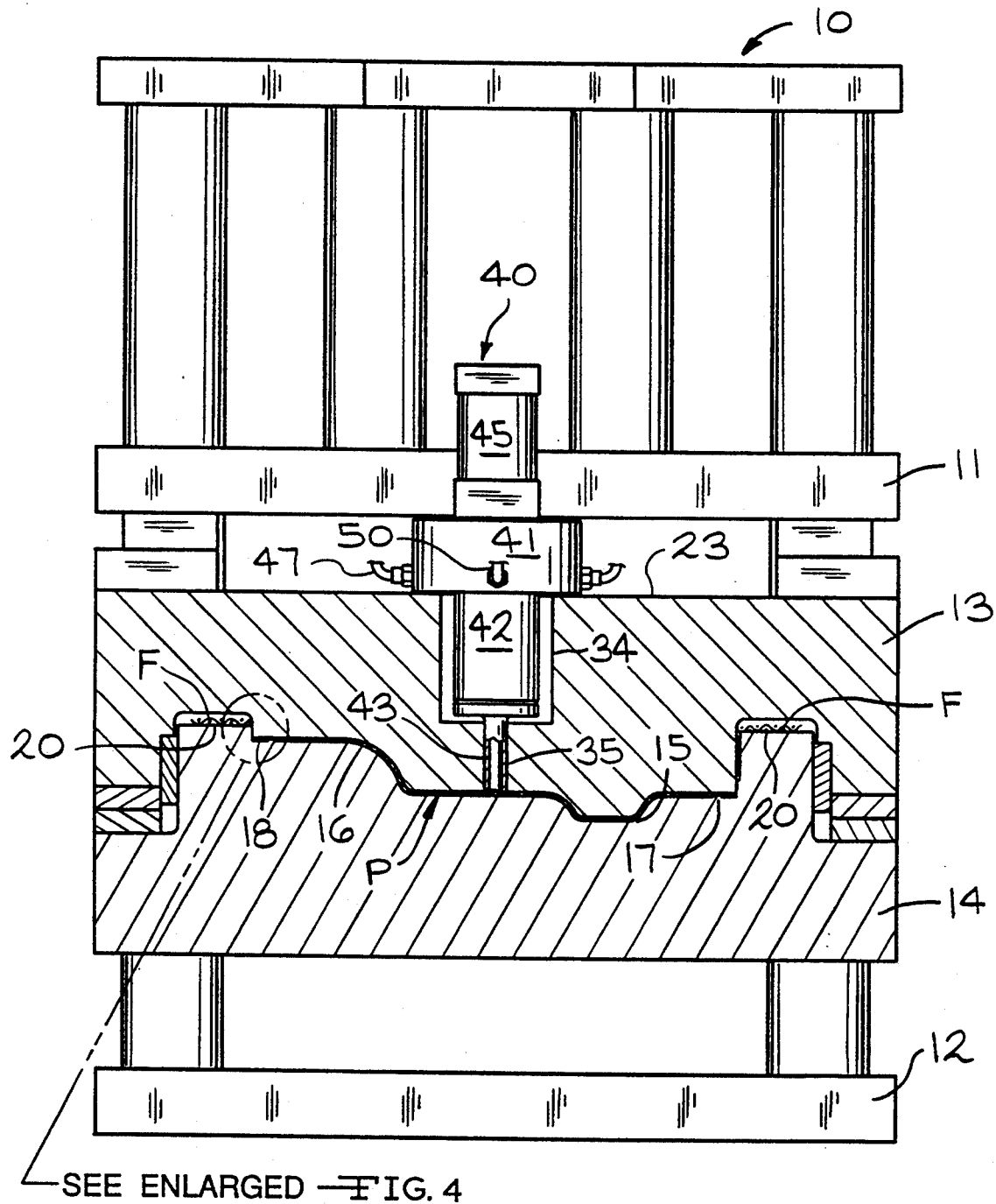
FIG. 3 is a view similar to FIG. 1 showing the mold halves in a fully closed position and the part compression molded in the cavity defined by the closed mold halves.

In the development of the present invention, the upper mold half 13 and the lower mold half 14 were configured to define, when closed, a molding cavity 15 (see FIG. 3) having a configuration corresponding to that of the finished molded part P and to provide means for trimming excess glass fiber reinforcing material. Additionally, the molding machine 10 is equipped with means for varying the speed of movement of the upper mold half 13 toward the lower mold half 14, means for injecting the liquid molding compound into the space between the mold halves prior to their complete closing to form the molding cavity and means for shearing off excess glass fiber reinforcing.

The lower mold half 14 is provided with a molding surface 16. A dam 17 extends upwardly from the molding surface 16 and encircles such molding surface 16. The lower mold half 14 is recessed outwardly of the dam 17 to form an overflow cavity 18 encircling the dam 17. A wall 19 extends upwardly from the overflow cavity 18 and tapers outwardly at an angle of approximately 3° (±1°) from vertical. A horizontal wall 20 encircles the upstanding wall 19. A vertical wall 21 extends downwardly from the horizontal wall 20 and a second horizontal wall 22 extends outwardly therefrom to the outer extremity of the lower mold half 14.

The upper mold half 13 includes a molding surface 26 which is encircled by a vertical wall 27 with the juncture between the molding surface 26 and the vertical wall 27 defining a shear edge 28 which is sized and has a configuration to contact the upstanding tapered wall 19 as the upper mold half 13 approaches its fully closed position to thereby sever glass fiber reinforcing extending therebetween. An inner horizontal wall 29 encircles the vertical wall 27. A heel block 30 is mounted below the inner horizontal wall 27. The heel block 30 slidingly engages the vertical wall 21 of the lower mold cavity 14 and assists in maintaining proper tracking of the upper mold half 13 as it is lowered to a fully closed position against the lower mold half 14. Stop blocks 31 are mounted at the outer extremities of both the upper mold half 13 and lower mold half 14 and engage one another when the upper mold half 13 reaches its fully closed position with the lower mold half 14.

The upper mold half 13 is provided with a central concavity 34 formed in its upper, non-molding surface 23 and a central passageway 35 extending from said concavity 34 through the upper mold half 13 to the molding surface 26.

Figure 5:
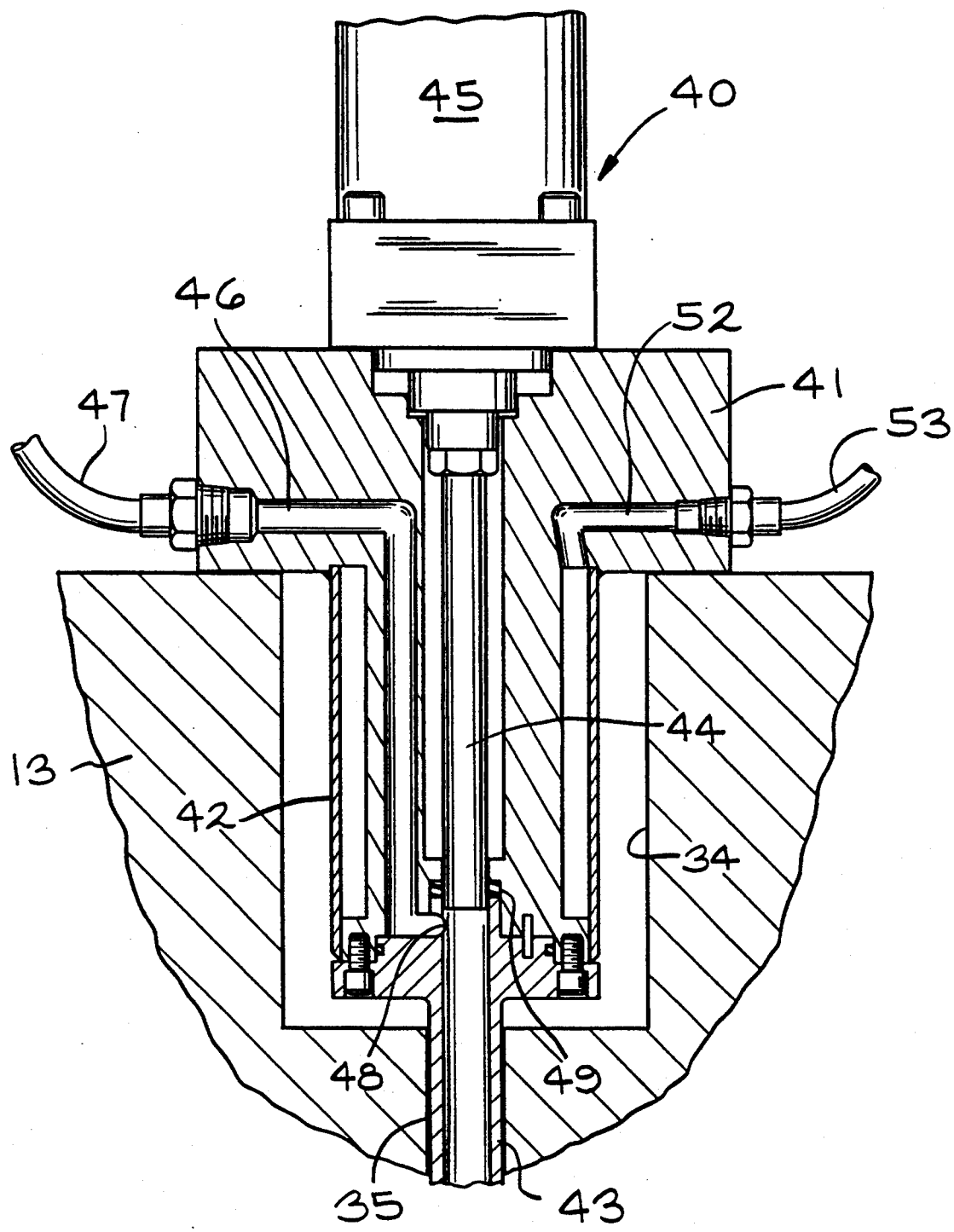
FIG. 5 is a sectional view showing the metering/injection head.

Mounted on the upper mold half 13 is an injection head 40 including a body portion 41 mounted on the upper surface 23 of the upper mold half 13. The injection head 40 is manufactured by EMC 2 Inc., Sterling Heights, Mich. A dispensing head 42 extends downwardly from the body 41 into the concavity 34 and has a dispensing tube 43 extending downwardly therefrom through the central passageway 35. The injection tube 43 terminates at the molding surface 26 of the upper mold half and functions to introduce the liquid molding compound into the space between the closing mold halves 13 and 14 immediately before the upper mold half reaches its closed position. A pin 44 (see FIG. 5) sized to be snugly received in the tube 43 is mounted on a hydraulic cylinder 45 for reciprocal movement throughout substantially the entire length of the dispensing tube 43. The body 41 and injector head 42 have formed therein a first passageway 46 for receiving the liquid molding compound through an entrance conduit 47 and directing it to an orifice 48 at the upper end of the dispensing tube 43. As can be seen from FIG. 5, a seal 49 is provided at the upper end of the dispensing tube 43 immediately above the orifice 48 to prevent the escape upwardly of any liquid molding compound. The seal 49 is sized to snugly and sealingly engage the outer surface of the pin 44 but to permit the pin 44 to move axially relative thereto while maintaining such seal. When the pin 44 is lowered to a closed position, it will close the orifice 48 and prevent the flow of liquid molding compound through the upper mold half 13. The first passageway 46 also communicates with an outlet conduit 50 in order to provide recirculation of the liquid molding compound when the orifice 48 is closed.

A second passageway 52 is provided for receiving water or other liquid temperature controlling medium from an inlet conduit 53. The passageway 52, which thus acts as a temperature controlling means for controlling the temperature of the liquid molding compound in the injection head, communicates with an outlet conduit, not shown, in order to provide for continuous circulation and accurate temperature control.

The operation of the apparatus and the method of forming a molded part P will now be described. With the mold halves 13 and 14 in a fully opened position as shown in FIG. 1 and with the pin 44 of the injection head fully extended to its lowered position mating with the molding surface 26, a sheet of glass fibers reinforcement F is positioned in the lower mold half such that it covers the molding surface 16 and extends beyond the dam 17, the overflow cavity 18 and onto the horizontal wall 20. The molding machine 10 is then actuated to rapidly lower the upper mold half 13 until it reaches a distance of approximately 2 inches from its fully closed position where the mold blocks 31 of the upper and lower mold halves make contact. The molds are maintained at a temperature of 290°–300° F.; however, the liquid molding compound is maintained at a temperature of 75°–77° F. as a result of the flow of liquid controlling means through the passageway 52. The rapid closure of the upper mold half will be at a speed on the order of 600 inches per minute. However, when the upper mold half 13 reaches a position of about 2 inches from its fully closed position, its speed will have been reduced to a slower speed on the order of 10–20 inches per minute. As soon as it reaches such position, the pin 44 is retracted within the passageway 43 in order to open the orifice 48. At that time, the liquid molding compound is injected into the partially closed mold cavity at pressures on the order of 100–150 pounds per square inch. The injection of such liquid molding compound is completed before the mold halves 13 and 14 reach their fully closed position. This is important in order to (1) vent any air from the mold cavity prior to its complete closure and (2) build up sufficient compressive pressures to cause the liquid molding compound to completely flow and wet the fiberglass reinforcing mat F. Thus compression pressures on the order of 250–300 tons will be imposed when the molds halves 13 and 14 are completely closed. Desirably, the mold halves 13 and 14 should be open at least $\frac{1}{4}''$ when the injection step is completed. Upon completion of the injection step, pin 44 is lowered into the tube 43 and the end of the pin extending to the molding surface 26 functions to mold the glass fibers reinforced part in that area. The molded part is heated by virtue of the heated molds to a temperature at which the material becomes fully set.

Figure 4:
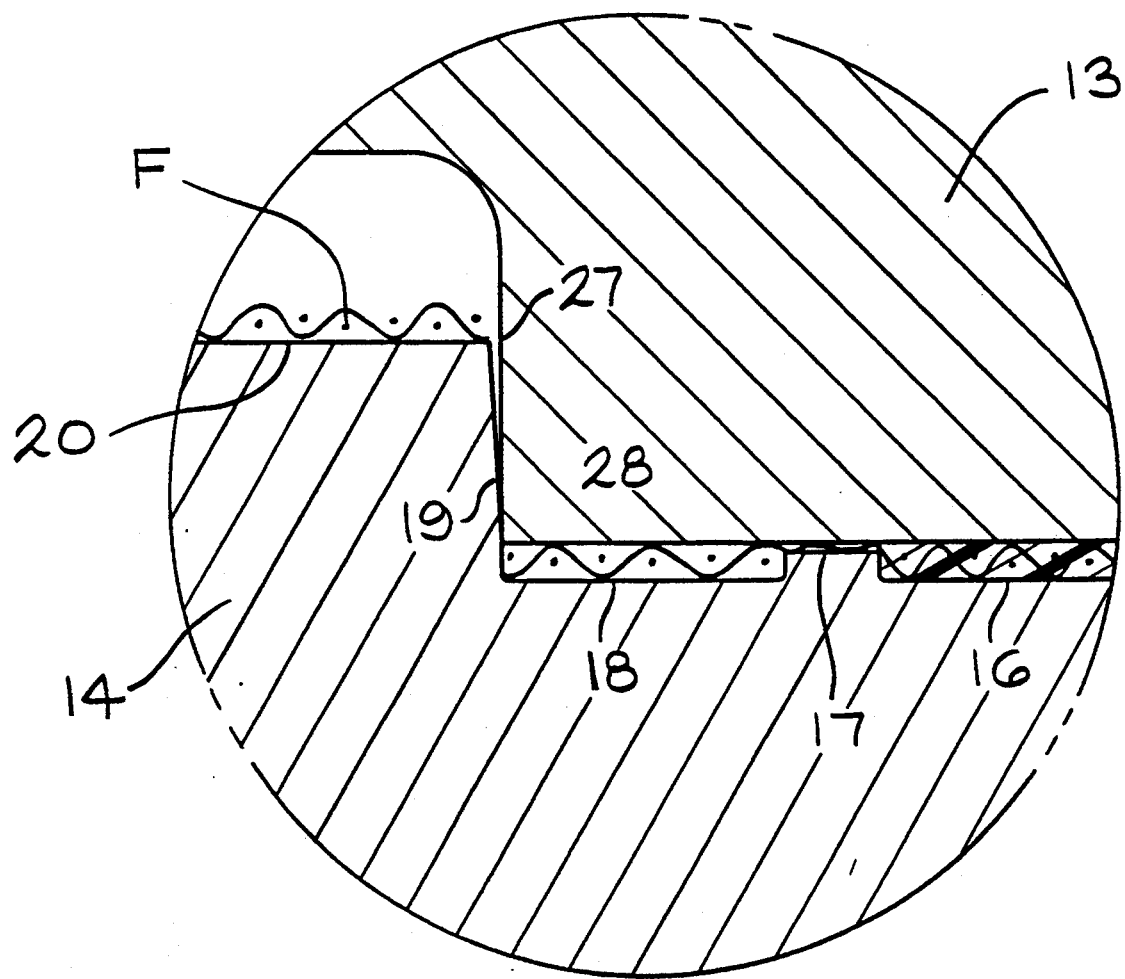
FIG. 4 is an enlarged sectional view of a fragment of FIG. 3 showing the shear edge for cutting excess glass fibers reinforcing.

During closing of the mold halves 13 and 14, the shear edge 28 will contact the upwardly extending wall 19 thereby cutting that portion of the glass fibers reinforcing matte F lying outwardly therefrom. As can be seen in FIG. 4, a portion of the plastic material may extend through the dam 17 and into the overflow cavity 18. Upon removal of the molded part from the lower mold half 14, the material extending into the overflow cavity may be trimmed.

The molding compound we developed to use in our low pressure, high speed molding process comprises:
 (a) an unsaturated polyester comprising a polycondensation of polyhydric alcohols and ethylenically unsaturated polycarboxylic acids;
 (b) saturated polyester polyurethane polymer;
 (c) one or more ethylenically unsaturated monomers which copolymerize with the unsaturated polyester; and
 (d) one or more low-profile thermoplastic polymers.

The unsaturated polyester component comprises the polycondensation reaction product of one or more polyhydric alcohols and one or more ethylenically unsaturated polycarboxylic acids. By polycarboxylic acid is generally meant the polycarboxylic or dicarboxylic acids or anhydrides, polycarboxylic or dicarboxylic acid halides, and polycarboxylic dicarboxylic esters. Suitable unsaturated acids, and the corresponding anhydrides and acid halides that contain polymerizable carbon-to-carbon double bonds may include maleic anhydride, maleic acid, and fumaric acid. Other acids that we use are dicarboxylic or polycarboxylic acids that do not contain a polymerizable carbon-to-carbon bond. Examples of which include O-phthalic, isophthalic, terephthalic, succinic, adipic, sebacic, methylsuccinic, trimellitic anhydride and the like.

Polyhydric alcohols that are useful in preparing the polyesters include, 1,2-propane diol (hereinafter referred to as propylene glycol), dipropylene glycol, diethylene glycol, 1,3-butanediol, ethylene glycol, glycerol, and the like.

The polyhydric alcohols include diols, triols, tetrols and higher functionality alcohols. They may be represented by the formula $R(OH)_x$ wherein R is an alkyl radical having 2 to 10 carbon atoms and X is an integer from 2 to 4. Preferably, we employ dihydric alcohols with alkyl groups having 2 to 5 carbon atoms.

The saturated polyester polyurethane polymers are prepared in a known way by condensation of a saturated or aromatic polycarboxylic acid and polyhydric alcohol.

Preferred saturated or aromatic dicarboxylic acids such as oxalic acid, succinic acid, adipic acid, suberic acid, terephthalic acid and/or esters/diesters thereof. Preferred alcohols are ethylene glycol, 1,4-butanediol and 1,6-hexanediol or the unsaturated 2-butylenediol (1,4).

Isocyanates that can be used in the preparation of the polyurethane portion of the polymer may be aliphatic, cycloaliphatic or aromatic compounds. Examples are hexamethylene diisocyanate (HMDI), isophorone diisocyanate (IPDI), paraphenylene diisocyanate, 4,4'-diisocyanatodicyclohexylmethane (HDI), 4,4'-diisocyanatodiphenylmethane (MDI), toluene diisocyanates (TDI), 1,4 di-(2-isocyanatoprop-2-yl) benzene, polyarylene polyphenylisocyanate (PAPI) and oligomeric polyisocyanates such as Desmodur-N or Desmodur-L, optionally in combination with monofunctional isocyanates such as phenylisocyanate and N-butylisocyanate.

The monomer component of the molding compound comprises materials that polymerize with the unsaturated polyester. The ethylenically unsaturated monomer that is copolymerizible with the unsaturated polyester is most generally styrene, however, methyl-styrene is also useful, as are acrylates and methacrylates such as methyl-acrylates, ethyl-acrylate, methyl-methacrylate, ethyl methacrylate, etc.

The low-profile additive component of resinous system comprises the thermoplastic polymers. Low-profile additives are materials that when mixed in an unsaturated polyester and cured, result in a multiphase system. Some polymers that are useful as low-profile additives include homopolymers and copolymers of acrylic and methacrylic acid esters, cellulose acetate butyrate, vinyl acetate homopolymers and copolymers, polyurethanes prepared from polyisocyanates, preferably diisocyanates, and polyether polyols, numerous saturated polyesters, polycaprolactone, styrene-butadiene copolymers, some modified celluloses, and certain alkyl oxide polymers, The above list of low-profile additives is not intended to list all low-profile additives but rather to show examples of materials which have been used to cause the multiphase morphology present in low-profile resins.

Other thermoplastic LPA's include:
(a) Acrylics
(b) Polyvinyl acetate
(c) Styrene copolymers
(d) Polyvinyl chloride (PVC) and PVC copolymers
(e) Cellulose acetate butyrate
(f) Polycaprolactones
(g) Thermoplastic polyester The molding compound may include a variety of other additives, wetting agents, catalysts, suppressants, promoters, release agents, fillers, pigments, thickeners and the like. The presence or absence of these materials depends on the desire to attain special effects in the molding compound we use.

Our invention may employ a number of reinforcement products. Examples are chopped strand mat, woven roving, woven glass fiber fabrics, braided strands, and knitted fabrics which are unidirectional, bidirectional or multidirectional.

Continuous strand mats also have been glass fiber reinforcements for plastics for many years. The mats have strands of infinite length in a random orientation which look like lazy whirl formations with each strand assuming an individualistic pattern or overlapping as coils. The industry gathers the strands on a conveyor, bonds then with a binder, cures and rolls them as flat goods to be shipped to a molder.

We also can use woven glass fabrics. The woven glass fabric may be a plain weave, twill weave, satin weave, woven roving or an unidirectional cross ply weave.

Glass fibers used in the practice of this invention can be, but are not restricted to "E" glass fibers, well known to those skilled in the art. Such fibers are described in U.S. Pat. No. 2,334,961. The glass is standard E glass, however, high strength magnesia, aluminum silicate glass fibers may also be employed if desired.

The preferred glass fiber reinforcements for our molding compound, however, are continuous swirl mat.

The following Example describes the formulation we used in our molding compounds. The Example also describes the special effects we sought to achieve with the various additives.

EXAMPLE I

| INGREDIENT | FORMULATION PRODUCT NO. | SOURCE | WEIGHT % |
|---|---|---|---|
| Resin | 14027C | Aristech Chemicals | 41.9 |
| Additive | Neulon H | Union Carbide | 12.0 |
| Additive | LPX-2030 | Ashland Chemicals | 6.0 |
| Wetting Agent | Byk-W-972 | Byk-Chemie | 0.3 |
| Catalyst | Lupersol 256 | GLS | 0.1 |
| Catalyst | TBPB | GLS | 0.6 |
| Styrene Suppressant | BMC-SST | Bergen Materials, Corporation | 0.3 |
| Promoter | Cobalt (12%) | Aristech Chemicals | 0.2 |
| Release Agent | Syn Pro 1301 | Synthetic Products | 0.3 |
| Glass Bubbles | Pluspheres 150 | Cachet | 6.0 |
| Filler | Camelfil | Genstar | 30.8 |
| Pigment | CF-2049 | Plasticolors | 1.5 |
| | | | 100.0 |

1. 14027C is an isophthalic unsaturated polyester resin dissolved in styrene monomer. Thermosetting polyester resins offer many advantages such as ease of handling, rapid cure, good balance of mechanical, electrical and chemical properties, good dimensional stability, easily modified for special characteristics and low cost. Variations can be made in the composition of the base polyester to yield resin pastes with a wide range of properties during and after polymerization.

2. Neulon H is polyvinyl acetate dissolved in styrene monomer sold by Union Carbide as Neulon H modifier. Thermoplastic polymers are combined with polyester resins to achieve low polymerization shrinkage. Shrinkage is primarily controlled by varying the polyester/thermoplastic ratio. It is possible to attain near "zero" shrinkage in molded parts, when thermoplastic polymers are added to polyester resins.

3. LPX-2030 is an aliphatic saturated polyester polyurethane polymer (40% solids) dissolved in styrene copolymer. It is used to achieve the desired shrinkage as well as offer good surface appearance and better flexibility.

4. Byk-W-972 is n-butyl acetate propylene glycol monomethyl ether acetate. This wetting agent reduces the viscosity of the mixture by a substantial amount (approx. 20%). In addition to this, the agent improves compatibility between polyester and the two additives mentioned above, thus offering slightly higher mechanical properties.

5. Lupersol 256 is 2,5-dimethyl 2,5-di (2-ethyl hexanoyl peroxy) hexane (90% liquid). The primary purpose of this catalyst is to initiate the chemical reaction (copolymerization) of the unsaturated polyester and monomer ingredients from a liquid to a solid state. Heat from the mold will cause the catalyst to decompose. This activates the monomer and polyester to form cross linked thermosetting polymers. Generally, the addition of 0.3 to 1.5%, by weight, of catalytic agents will adequately promote the cross linking reaction. The selection of particular catalyst depends upon one or a combination of these factors:
 (a) Temperature of cure
 (b) Rate of cure desired
 (c) Means of activating catalyst
 (d) Cost
 (e) Mass of resin involved
 (f) Inhibitor type
 (g) Shelf life required Lupersol 256 starts its initiation reaction when material temperatures in the area of 200° to 210° F. are achieved. It normally decomposes at temperatures in the range of 260° to 270° F. This catalyst is less stable but offers accelerated cures when combined with more stable peroxides such as TBPB.

6. TBPB is t-butyl peroxy benzoate is a high temperature catalyst. This catalyst becomes active at temperatures of 260° to 270° F. and starts decomposing at much higher temperatures of 300° to 310° F. This product along with low temperature catalyst are known to complete cure at much faster rates. Therefore, the dual catalyst is used to start its reaction at much lower temperatures and complete the cure at much higher temperatures.

7. BMC-SST is a methacrylate based, styrene suppressant which reduces the evaporation of styrene from catalyzed unsaturated polyester resins. Cured substrates tend to release styrene odor at ambient conditions. As the environmental temperature increases, the styrene concentration around the substrate show high levels. Such levels have been reduced to virtually no odor with the styrene suppressant.

8. Cobalt solution is 12% cobalt naphthenate in a diluent. It is used as a promoter along with catalyst to accelerate the chemical reaction and complete the curing stage at a much faster rate. The product also converts any free radical or any residual styrene to a solid state, thus reducing the odor from the substrate.

9. Synpro 1301 is Zinc octoate/46% Octo acid phosphate used as internal release agent. This type of mold release agents is used at the lowest concentrations possible to do an adequate job. Normally, they will be used in concentration less than 2%, by weight, of the total compound. Excessive amounts may reduce mechanical strength and cause objectionable cosmetic appearance on the molded part surfaces.

10. Pluspheres 150 is hollow silicate glass microspheres which offer very low specific gravity (approx. 0.66 to 0.69 g/cc). The primary purpose of this product is to lower the density of the substrate. As the concentration of glass bubbles is increased, even lower densities can be expected, however, mechanical properties are affected. Therefore, optimum levels of the product must be selected to achieve desired densities and not effect physical properties.

11. Camelfil is 91% calcium carbonate which enhances the appearance of molded parts, promote flow of the glass reinforcment during the molding cycle and reduces the over all cost of the compound. Preferably, the Camelfil used in the present invention has a particle size of 6 to 7 microns. Calcium carbonates are fillers which can be added in large amounts, while still maintaining a processable paste. They assist in reducing shrinkage of the molded parts and in distributing glass reinforcement for better strength uniformity. The particle size of fillers is an important consideration for optimizing formulations. Smaller particle sizes provide better flow of the molding material and improve surface appearance of the molded parts.

12. CF-2049 is carbon black pigment. Pigment concentration generally falls in the range of 1 to 5%, by weight, of the resin paste. Pigments can affect cure time and shelf life stability. This may accelerate or inhibit the reactivity of the resin-catalyst system. Generally, pigments tend to reduce mechanical properties.

EXAMPLE II

We molded the formulation of Example I according to our low pressure, high speed molding process. The molded parts were black in color and resembled automobile body parts. The dark, black pigmented parts had essentially zero-shrink. The molded parts had the following features:

| Feature | Property |
| --- | --- |
| Shrinkage (mils/inch) | 0.3126 mils/inch expansion |
| Impact Strength | 13.09 ft lbs f/inch |
| Flex Strength | 18,705 psi |
| Sp. Gr | 1.43 |
| Aesthetics | |
| pigmentation | black |
| gloss | good |

Modifications of the present invention will become readily apparent to those skilled in the art. Accordingly, the scope of the present invention should be limited only by the scope of the claims.

We claim:

1. A method of molding a plastic part having glass fiber reinforcing comprising:
 (a) providing a mold having upper and lower halves with contoured molding surfaces which cooperate when in a closed position to define a mold cavity corresponding to the desired shape of the part;
 (b) placing a mat of glass fiber reinforcing material in said lower half with a portion extending beyond said cavity;
 (c) moving one of said mold halves toward the other of said mold halves at a rate of speed greater than a predetermined amount until it is positioned within a predetermined distance from said other mold half;
 (d) reducing the speed of movement of said one mold half to a speed slower than said predetermined amount;
 (e) injecting a flowable molding compound into the space between said upper and lower mold halves and completing said injecting step prior to said mold halves reaching said closed position; and
 (f) continuing said movement at said slower speed to close said upper and lower mold halves and shape said molding compound into conformity with said cavity.

2. The method according to claim 1, wherein said upper and lower mold halves are provided with cooperating shear members outside of said contoured molding surfaces and further including the step of cutting said glass fiber reinforcing material extending beyond said cavity with said shear members upon closing of said upper and lower mold halves.

3. A method of molding a plastic part having glass fiber reinforcing comprising:
   (a) providing a mold having upper and lower halves with contoured molding surfaces which cooperate when in a closed position to define a mold cavity corresponding to the desired shape of the part, and an overflow cavity encircling said mold cavity;
   (b) placing a mat of glass fiber reinforcing material in said lower half with a portion extending beyond said cavity;
   (c) moving one of said mold halves toward the other of said mold halves at a rate of speed within a predetermined range until it reaches a distance of less than 2 inches from said other mold half;
   (d) reducing the speed of movement of said one mold half to a slower speed outside of said range;
   (e) injecting a flowable molding compound into the space between said upper and lower mold halves and completing said injecting step prior to said mold halves reaching said closed position; and
   (f) completing said movement to close said upper and lower mold halves.

4. The method according to claim 3, wherein said upper and lower mold halves are provided with cooperating shear members and further including the step of cutting said glass fiber reinforcing material extending beyond said overflow cavity upon closing of said upper and lower mold halves.

5. A method of molding a plastic part having glass fiber reinforcing using a heat settable polyester resin comprising:
   (a) proving a mold having upper and lower halves with contoured molding surfaces which cooperate when in a closed position to define a mold cavity corresponding to the desired shape of the part;
   (b) placing a mat of glass fiber reinforcing material in said lower half;
   (c) moving one of said mold halves toward the other of said mold halves until it reaches a distance of less than 2 inches from said other mold half;
   (d) moving said resin to a position adjacent said mold halves while maintaining said resin in a flowable condition having a viscosity no greater than 10,000 cps;
   (e) injecting said resin while in flowable condition into the space between said upper and lower mold halves and completing said injecting step prior to said mold halves reaching said closed position; and
   (f) continuing moving of said one mold half to close said upper and lower mold halves.

6. The method according to claim 5, wherein said resin is maintained at a temperature of 75° to 77° F. prior to the step of injection.

7. The method according to claim 6, wherein said resin has a temperature of at least 90° F. during said step of injecting said resin.

8. The method according to claim 5, wherein a portion of said mat extends beyond said mold cavity and further including the step of cutting the portion of said mat extending beyond said cavity upon closing of said upper and lower mold halves.

9. A method of molding a plastic part having glass fiber reinforcing using a heat settable polyester resin comprising:
   (a) providing a mold having upper and lower halves with contoured molding surfaces which cooperate when closed to define a mold cavity corresponding to the desired shape of the part;
   (b) placing a mat of glass fiber reinforcing material in said lower half;
   (c) moving one of said mold halves toward the other of said mold halves until it reaches a distance of less than 2 inches from said other mold half;
   (d) moving said resin to a position adjacent said mold halves while maintaining said resin in a flowable condition having a viscosity no greater than 10,000 cps;
   (e) injecting said resin while in flowable condition into the space between said upper and lower mold halves; and
   (f) continuing moving of said one mold half to close said upper and lower mold halves with the step of injecting said resin being completed prior to completion of step (f).

10. A method of molding a plastic part having glass fiber reinforcing using a heat settable polyester resin comprising:
    (a) providing a mold having upper and lower halves with contoured molding surfaces which cooperate when closed to define a mold cavity corresponding to the desired shape of the part;
    (b) placing a mat of glass fiber reinforcing material in said lower half;
    (c) moving one of said mold halves toward the other of said mold halves until it reaches a distance of less than 2 inches from said other mold half;
    (d) moving said resin to a position adjacent said mold halves while maintaining said resin in a flowable condition having a viscosity no greater than 10,000 cps and a temperature of 75° to 77° F.;
    (e) injecting said resin while in flowable condition and a temperature of at least 90° F. into the space between said upper and lower mold halves; and
    (f) continuing moving of said one mold half to close said upper and lower mold halves, said mold halves being maintained at a temperature of 290°–300° F. during said steps of injecting said resin and closing said upper and lower mold halves.

11. The method according to claim 8, wherein said mold halves are maintained at said temperature until said resin is set.

12. A method of molding a plastic part having glass fiber reinforcing comprising:
    (a) providing a mold having upper and lower halves with contoured molding surfaces which cooperate when closed to define a mold cavity corresponding to the desired shape of the part;
    (b) placing a mat of glass fiber reinforcing material in said lower half with a portion extending beyond said cavity;
    (c) moving one of said mold halves toward the other of said mold halves at a rate of speed greater than a predetermined amount until it is positioned within a predetermined distance from said other mold half;

(d) reducing the speed of movement of said one mold half to a speed slower than said predetermined amount;

(e) injecting into the space between said upper and lower mold halves a liquid molding compound comprising:

(i) an unsaturated polyester comprising a polycondensation product of one or more polyhydric alcohols and one or more ethylenically unsaturated polycarboxylic acids;

(ii) a saturated polyester polyurethane polymer;

(iii) one or more olefinically unsaturated monomers which copolymerizes with the unsaturated polyesters;

(iv) one or more low-profile thermoplastic polymers which cause phase separation and porosity during a curing reaction;

(v) a low temperature catalyst having an initiation reaction temperature; and (vi) a high temperature catalyst having an initiation reaction temperature at least 50° F. higher than the initiation temperature of the low temperature catalyst; and (f) continuing said movement at said slower speed to close said upper and lower mold halves and shape said molding compound into conformity with said cavity.

13. The method according to claim 12, wherein said upper and lower mold halves are provided with cooperating shear members outside of said contoured molding surfaces and further including the step of cutting said fiberglass reinforcing material extending beyond said cavity with said shear members upon closing of said upper and lower mold halves.

* * * * *